United States Patent
Crews

[15] 3,666,959
[45] May 30, 1972

[54] BATTERY PROTECTIVE MEMORY SYSTEM FOR AUTOMOTIVE VEHICLES

[72] Inventor: Clarence M. Crews, 4706 North Pacific Highway, Central Point, Oreg. 97501

[22] Filed: Jan. 28, 1971

[21] Appl. No.: 110,547

[52] U.S. Cl. .............................307/10 BP, 200/44, 340/52, 340/54, 315/82
[51] Int. Cl. .....................................................H02g 3/00
[58] Field of Search...................307/10, 10 BP; 315/80, 81, 315/82, 83; 340/53, 54; 200/44, 42

[56] References Cited

UNITED STATES PATENTS 3,385,998  5/1968  Gold.............................307/10 BP X
3,391,301  7/1968  Poznik......................................315/83

Primary Examiner—Herman J. Hohauser

[57] ABSTRACT

A novel battery protective system for automotive vehicles is provided in which both the running lights and the parking lights are controlled by a common light switch operator, which operator is restricted, and in some circumstances actuated, by the key controlled, ignition switch actuator. In the normal, non-operating condition of the ignition switch actuator, according to my invention, the running lights are necessarily off and cannot be turned on. The parking lights may be turned on and off manually, but are turned off and blocked against being turned on by operation of the ignition switch actuator to running position or to the utilities position. The turning of the ignition switch actuator to running position or to utilities position makes possible the manual turning on and turning off of the running lights, but turns off the parking lights (if on) and blocks the turning on of the parking lights. Return of the ignition switch actuator to normal, non-operating position turns off the running lights but does not restore the parking lights. No running or parking lights will ever be turned on or left on immediately following the turning off of the ignition switch actuator. No running or parking lights will ever be turned on or left on immediately following the turning on of the ignition switch actuator. The system is fool-proof.

6 Claims, 4 Drawing Figures

Patented May 30, 1972 3,666,959

Clarence M. Crews

BATTERY PROTECTIVE MEMORY SYSTEM FOR AUTOMOTIVE VEHICLES

This invention relates to light controlling, battery protective means for automotive vehicles, being in the nature of an improvement upon the memory system disclosed and claimed in my letters patent of the U.S. No 3,337,768 of Aug. 22, 1967.

In accordance with the disclosure of that patent, provision is made of a unit which could be added to, or substituted for, the normal running light control means. When so substituted, the running lights could be turned on only by first turning on the key controlled ignition switch actuator and then operating a memory switch for turning on the running lights. The running lights could be turned on and off at will so long as the ignition switch actuator remained in running position, but the turning off of the ignition switch to kill the engine (and generally to permit the key to be withdrawn) had the very advantageous characteristic of turning off the running lights and thereby protecting the battery against being drained. The patented arrangement had the further advantage that subsequent turning on of the ignition switch actuator merely made the running lights available but did not turn them on.

The operator did not have to remember to turn the running lights off, and he did not have to remember whether the running lights had been used when the vehicle was last previously operated. The running lights could never be left on unintentionally and they could never be turned on unintentionally.

That system, as illustratively disclosed in the patent, involves the retaining closed of the memory switch through electromagnetic means.

That system was disclosed in the form of an accessory unit, designed to be added to or substituted for, a completely operative, conventional system, which conventional system itself provided no assurance against draining of the battery through inadvertent leaving on of the running lights or the parking lights.

The primary object of the present invention is to achieve the objectives of the patent referred to through mechanical operation, and/or limitation, of a running light switch operator by the ignition switch actuator.

To this end, a running light switch operator is made cooperative with mechanical means operated directly by, and in harmony with, the ignition switch actuator for blocking the turning on of the running lights so long as the ignition switch actuator occupies the normal, non-operating position. Operation of the ignition switch actuator either to the engine operating position or to the utilities position, leaves the running light operator free to be manually operated for turning the running lights on and off. Restoration of the ignition switch actuator to the normal, non-operating position restores the running light switch to the "off" position, (if the running lights have been turned on), and blocks it against turning the running lights on.

As a further feature, the running light switch operator may be turned in the opposite direction from the "off" position to turn on the parking lights. The operator is free to turn on the parking lights with the ignition switch actuator in the normal, non-operating position. Operation of the ignition switch actuator to the running position or to the utilities position moves the light switch operator to the "off" position, not only turning off the parking lights but blocking the manual turning on of the parking lights until after the ignition switch actuator has been returned to the normal, non-operating position.

As a consequence of this arrangement, the operation of the ignition switch actuator from the running or the utilities position to the normal, non-operating position always leaves the running lights and the parking lights off, but with the parking lights available to be turned on if desired.

A still further feature of the invention has to do with providing a partial safeguard of the vehicle against theft. A switch which grounds out the ignition circuit is normally closed with the ignition switch actuator in the normal, non-operating position, so that the ignition switch cannot be successfully bypassed by a jumper. This switch to ground is opened, rendering the ignition switch circuit fully operative, in response to the operation of the ignition switch actuator to the engine operating position.

Other objects and advantages will hereinafter appear.

In the drawing forming part of this specification,

Figure 1:
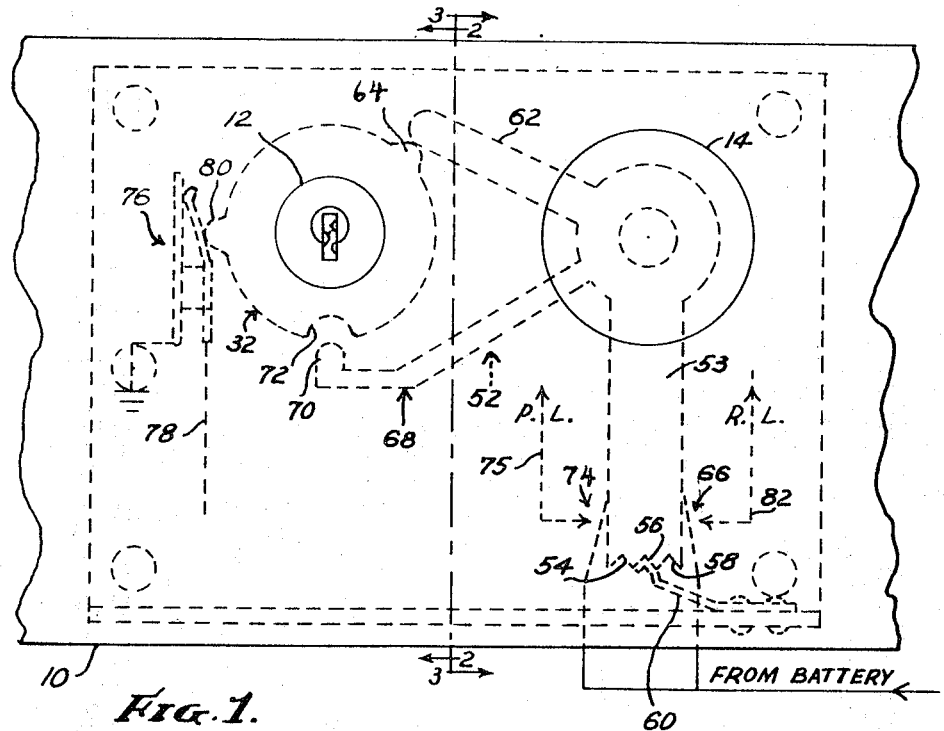
FIG. 1 is a fragmentary view in elevation of a segment of a dashboard of a motor vehicle, as viewed from the driver's seat, with the concealed portions of the ignition switch actuator and interrelated light controls shown in broken lines.
Figure 2:
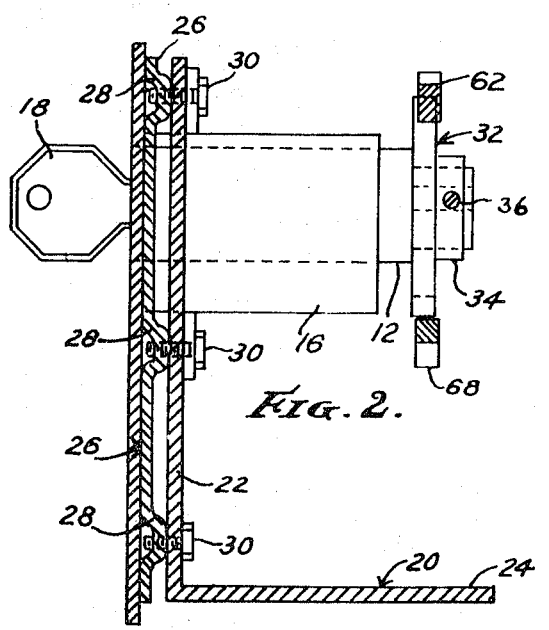
FIG. 2 is a sectional view showing chiefly the ignition switch actuator and mechanism directly responsive thereto, the section being taken on the line 2—2 of FIG. 1, looking in the direction of the arrows.
Figure 3:
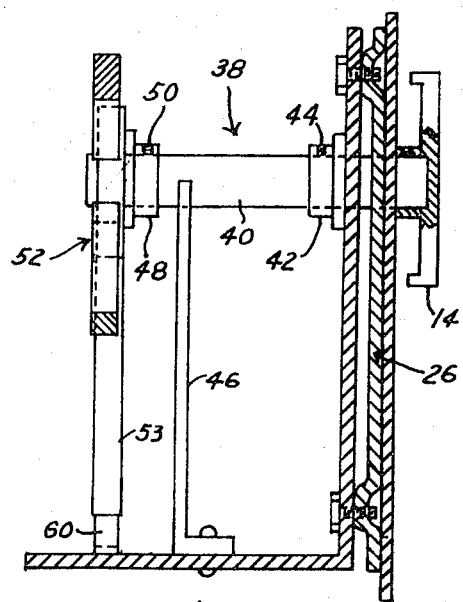
FIG. 3 is a sectional view, showing chiefly the light switch operator, the section being taken on the same section line 2—2 as FIG. 2 (also designated as 3—3), but looking in the direction of the arrows designated 3—3.

In FIG. 1 a fragmentary view of a dashboard 10 is shown, limited to that portion only which reveals the ignition switch actuator 12 and a light switch operating knob 14. The ignition switch actuator is, as usual, locked against rotation in a stationary pin tumbler cylinder 16 in a normal, non-operating position. The ignition switch actuator 12 is rotatably mounted in the cylinder and is adapted to be turned by a key 18 either clockwise to a running position in which the ignition circuit is rendered active, or counter-clockwise to a position in which the utilities circuit is rendered active or the utilities are at least made available, but the ignition circuit is not made available. The action of the lock is not illustrated because it is purely conventional and is well understood, has no detailed bearing upon the novel features of the invention, and is present in operative form upon millions of vehicles.

In the present instance it is desirable, though not essential, that the ignition switch actuator and the light switch operator be organized into a compact unit which may be conveniently mounted on the concealed side of the dashboard. For this purpose a carrier plate 20 is provided which comprises a vertical rear wall 22 and a horizontal front wall or floor 24. The plate 20 may be cut away or skeletonized where parts are not needed, may be modified to provide supporting brackets, or may have brackets, etc. applied to it as required for conventional purposes.

The unit may be made fast with the dashboard at the concealed side thereof. Illustratively, a mounting plate 26, having bosses 28 displaced forwardly from it, may be spot welded to the forward (concealed) side of the dashboard before the exposed side of the dashboard has been decoratively finished.

Headed screws 30, passed through the wall 22 of the plate 20, and secured through threaded openings in the bosses 28, may be utilized for holding the unit in place.

A cam 32 is keyed on a reduced rear end portion of the ignition switch actuator 12 for rotation in unison therewith, the cam having a collar 34, through which it is fixed in position on the ignition switch actuator by means of a set screw 36. The cam will be described in further detail and its operation explained after the light switch operator 38 has been adequately described.

The knob 14, which forms the only readily accessible part of the light switch operator 38, is made fast on the exposed rear end of a shaft 40 by means of a set screw 44, the knob 14 and the collar 42 serving to fix the position of the shaft relative to the plates. Intermediate its ends, the shaft 40 is desirably sustained and steadied by a bearing plate 46.

Fixed on the forward end of the shaft 40, through a collar 46 and set screw 50, is a three-armed lever 52. The lever 52 includes a downwardly extending arm 53 having three notches 54, 56 and 58 formed in its lower end. A leaf spring 60, having one end affixed to the floor portion 24 of the plate 20, has a bent, pointed free end which normally bears in the notch 56 for retaining the lever in a lights-off position. It may also bear in the notch 54 or the notch 58 when the lever is turned counter-clockwise and clockwise, respectively, to bring the notches into position to be engaged by said detent spring. The function of the spring is to retain the light switch operator yieldingly in any one of three positions; to-wit, a normal, lights-out position as shown, a running light position when it engages the notch 54, and a parking light position when it engages the notch 58. The spring, in cooperation with the notches, also biases the lever to precisely the positions desired. The lights-off position is an intermediate position.

The lever 52 also includes an arm 62 which extends over into the zone of influence of the cam 32. As shown in FIG. 1, the arm 62 engages a lobe 64 of the cam, the lobe being in the position dictated by the normal, non-operating position of the ignition switch actuator. The lobe 64 blocks the lever 52 against counter-clockwise movement and hence precludes closing of a running-light-energizing switch 66, the switch 66 being normally biased to an open condition as shown.

When the ignition switch actuator is turned clockwise to running position or counter-clockwise to utilities position, the cam lobe 64 is moved clear of the arm 62. The position of the light switch operator is not affected by either of these movements, but since the arm 62 is no longer obstructed by the lobe 64, the knob 14 may be turned counter-clockwise for closing the running light switch 66, and thereby completing connection to the running lights through conductor 82. Return of the ignition switch actuator from either the running position or the utilities position to the original, normal, non-operating position will cause the lobe 64 to cam the arm 62 to the position shown in FIG. 1, thereby restoring the light switch operator to the "off" position.

A third arm 68 of the lever 52 includes a follower end portion 70 which, in the normal, non-operating position of the ignition switch actuator illustrated in FIG. 1, stands tangent to the normal, circular periphery of the cam 32, but opposite a notch 72 therein. With the ignition switch actuator in the position shown the lever 52 may be turned clockwise by knob 14 to lodge the portion 70 in the notch 72, thereby to turn on the parking lights through a switch 74 and a conductor 75, and to lodge the free end of detent spring 60 in the notch 58. Rotation of the ignition switch actuator to or toward either the running position or the utilities position will cam the arm 68 outward, restoring the light switch operator to the "lights off" position of FIG. 1, and thereby turning off the parking lights. Returning the ignition switch actuator to the normal, non-operating position of FIG. 1 will always restore the condition of the light switch operator to the condition of FIG. 1, with all parking and running lights out, but with the parking lights only having the potentiality of being turned on and then off by operation of the knob 14.

It is an important and significant fact that, regardless of whether the parking lights are in use, the turning of the ignition switch actuator from the normal, non-operating position to either the running position or the utilities position will assuredly produce a condition in which the running lights and the parking lights are out, but the running lights only can be manually turned on.

It is an even more important and significant fact that, regardless of whether the running lights are on with the ignition switch actuator in either the operating position or the utilities position, restoration of the ignition switch actuator to the normal non-operating position will assuredly produce a condition in which the running lights and the parking lights are out, but the parking lights only can be manually turned on.

While the primary object of the invention is to prevent draining of the battery through the inadvertent leaving on of lights following the operation of the vehicle, while avoiding the unwitting turning on of lights by the mere turning on of the ignition switch actuator, the provision of the cam 32 makes available a convenient means for interfering with theft of the vehicle by resort to a jumper.

A normally open switch 76 to ground is accordingly provided, the switch being connected to the ignition circuit through a conductor 78. The switch is held closed by a lobe 80 of the cam 32 with the ignition switch actuator in the normal, non-operating position, but is permitted to spring open in response to key operation of the ignition switch actuator away from that position.

Figure 4:
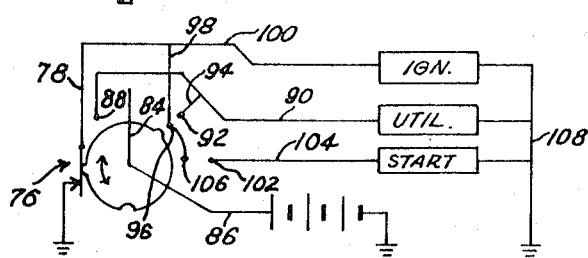
FIG. 4 is an electrical diagram indicating chiefly the relation of the ignition, utilities and starter circuits to the ignition switch actuator.

The relationship of the ignition switch actuator to the ignition, utilities and starter circuits is diagrammatically indicated in FIG. 4.

When the ignition switch actuator is turned counter-clockwise to the utilities position it completes a connection through a contact 88 and a conductor 90 to the utilities circuit. The utilities circuit, of course, includes branches, each of which may include an additional switch or switches, manual or automatic or both, as circumstances may require.

When the ignition switch actuator is turned clockwise to the running position, the member 84 completes a connection through a terminal contact 92, a branch conductor 94 and the conductor 90 to the utilities circuit. It simultaneously completes a connection through a terminal contact 96 and conductors 98 and 100 to the ignition circuit.

When the ignition switch actuator is turned further in a clockwise direction to the starter operating position, it completes required connections to the starter relay and to the starter motor through a terminal contact 102 and a conductor 104. It simultaneously completes a connection to the ignition circuit through a terminal contact 106 and conductors 98 and 100. As usual, the ignition switch actuator may be spring returned from starter operating position to running position.

There is nothing to prevent turning on of the running lights after the ignition switch actuator has been operated to running position and before advancing it to the starter operating position, but since that would be an awkward, unnatural and undesirable mode of operation, no safeguard against it is required.

The ignition circuit, the utilities circuit and the starting circuit are all shown as grounded through a common conductor 108. These could, of course, be separate groundings. The battery terminal not connected to the conductor 86 is also shown as grounded. The use of ground connections is a practical but not a compulsory arrangement. Many detail variations in harmony with varied conventional practices are permissible within the scope of the invention.

I have shown and described what I believe to be the best embodiment of my invention. What I desire to secure by letters patent is set forth in the following claims.

I claim:

1. Battery protective means in an automotive vehicle having a storage battery, an ignition switch actuator operable between a normal, non-operating position and a running position, and running lights, the combination with said battery, ignition switch actuator and the running lights of
   a. a manually operable light switch operator having an "off" position and a running-light-energizing position, and
   b. mechanical means directly connected for operation by, and in harmony with, the ignition switch actuator and effective at times mechanically to restrict operation of the light switch operator, and at times to operate the light switch operator to the "off" position, said mechanical means being constructed and arranged
      1. physically to block the light switch operator against manual operation to the running-light-energizing position so long as the ignition switch actuator stands in its normal, non-operating position,
      2. to free the light switch operator for voluntary manual operation to and from the running-light-energizing position, in response to the placing of the ignition switch actuator in the engine operating position, and
      3. mechanically to return the light switch operator to the "off" position and thereby to extinguish the running lights, if they have been turned on, in response to the manual operation of the ignition switch actuator from the running position to the normal, non-operating position.

2. Battery protective means for an automotive vehicle as set forth in claim 1 in which the ignition switch actuator also has a utilities position at the opposite side of the normal, non-operating position from the running position, in which the mechanical means connected for operation by the ignition switch actuator is constructed and arranged to free the light switch operator for voluntary manual operation to and from running-light-energizing position by movement of the ignition switch actuator to the utilities position, and to extinguish the running lights, if they have been turned on, by mechanically returning the running-light-switch operator to the normal "off" position in response to operation of the ignition switch actuator from the utilities position to the normal, non-operating position.

3. Battery protective means for an automotive vehicle as set forth in claim 2 in which the mechanical means driven directly by the ignition switch actuator consists of a cam having a protruding lobe, and the running-light-switch operator includes an arm which is engaged by said cam lobe in the normal, non-operating position of the ignition switch actuator to prevent operation of the running-light-switch operator in a direction to turn on the running lights, said arm being cleared by the lobe when the ignition switch actuator is turned to the running position or to the utilities position, but being placed in the path of the lobe, by turning on of the running lights, so that the return of the ignition switch actuator to the normal non-operating position will, through the lobe and arm, force the turning out of the running lights.

4. Battery protective means for an automotive vehicle as set forth in claim 1 in which the vehicle is also equipped with parking lights, and the light switch operator is designed to be moved in one direction from said "off" position for turning on the running lights and to be turned in the opposite direction from the "off" position for turning on the parking lights, and in which the mechanical means directly operated by the ignition switch actuator, and the light switch operator, include cooperating parts, constructed and arranged to permit the parking lights to be manually turned on and off by the light switch operator when the ignition switch actuator is in the normal, non-operating position, but to be mechanically turned off by the manual operation of the ignition switch actuator away from the normal, non-operating position, the construction and arrangement being such that both the parking lights and the running lights will necessarily be out immediately following operation of the ignition switch actuator to the running position or to the normal, non-operating position, the running lights being free to be manually turned on and off by the light switch operator following the operation of the ignition switch actuator to running position and the parking lights being free to be manually turned on and off by the light switch operator following the operation of the ignition switch actuator to the normal, non-operating position.

5. Battery protective means for an automotive vehicle as set forth in claim 4 in which the mechanical means operated by the ignition switch actuator, and the light switch operator are so related that manual operations of the ignition switch actuator to and from the utilities position have the same effects, respectively, upon the light switch operator as manual operations of the ignition switch actuator to and from the running position have.

6. Battery protective means for an automotive vehicle as set forth in claim 1 in which a grounding connection is provided for rendering the ignition circuit inoperative, even through a jumper, when the ignition switch actuator is locked in the normal, non-operating position, said grounding connection including a normally open switch which is made responsive to the ignition switch actuator through the mechanical means directly connected for operation by and with the ignition switch actuator, said switch being freed to spring open for making the ignition circuit operative, in response to operation of the ignition switch actuator away from the normal, non-operating position.

* * * * *